United States Patent [19]

van den Enden et al.

[11] Patent Number: 4,560,836
[45] Date of Patent: Dec. 24, 1985

[54] FOUR-WIRE COMMUNICATION LINE CIRCUIT AND CONFERENCE NETWORK COMPRISING SUCH CIRCUITS

[75] Inventors: Adrianus W. M. van den Enden; Job F. P. van Mil, both of Eindhoven, Netherlands

[73] Assignee: U.S. Philips Corporation, New York, N.Y.

[21] Appl. No.: 509,821

[22] Filed: Jun. 30, 1983

[30] Foreign Application Priority Data

Jul. 2, 1982 [NL] Netherlands .......................... 8202667

[51] Int. Cl.[4] ............................................ H04M 3/56
[52] U.S. Cl. ............................................... 179/18 BC
[58] Field of Search ............ 179/18 BC, 170.6, 170 D, 179/170 R

[56] References Cited

U.S. PATENT DOCUMENTS

| | | | |
|---|---|---|---|
| 3,128,353 | 4/1964 | Gardner | 179/170.6 |
| 3,135,829 | 6/1964 | Hultberg | 179/18 BC X |
| 3,168,619 | 2/1965 | Harrison | 179/170.6 X |
| 3,745,261 | 7/1973 | Friedman | 179/81 R |
| 3,952,166 | 4/1976 | Kato et al. | 179/81 B |
| 4,425,478 | 1/1984 | van Mil et al. | 179/18 BC |

FOREIGN PATENT DOCUMENTS 1094306 12/1960 Fed. Rep. of Germany ... 179/18 BC
1602473 11/1981 United Kingdom .......... 179/18 BC

*Primary Examiner*—Thomas W. Brown
*Attorney, Agent, or Firm*—Thomas A. Briody; William J. Streeter; Leroy Eason

[57] ABSTRACT

A four-wire communication line circuit for two or more two-wire subscriber lines, comprising a pair of amplifiers respectively connected in the line pairs of the four-wire line for each direction of transmission and a transmission direction detection circuit connected to each line pair. The detection circuit generates a control signal from the voltage signals transmitted on the line pairs, and which is dependent on the direction in which the net energy of such voltage signals is transmitted over the two-wire subscriber lines. The control signal is applied to control circuitry which switches the gain factors of the line amplifiers between a high and a low value, as determined by the direction of net energy transmission. When used in a conference network, the four-wire communication line circuit includes circuitry for establishing a higher threshold level at which the amplifier gain factors will be switched to a high level for transmission than the threshold level at which they are switched to a high value for reception.

4 Claims, 2 Drawing Figures

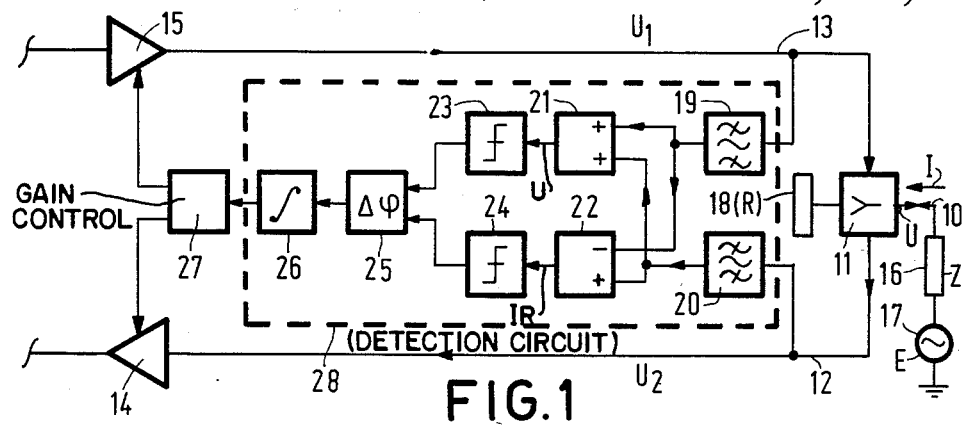
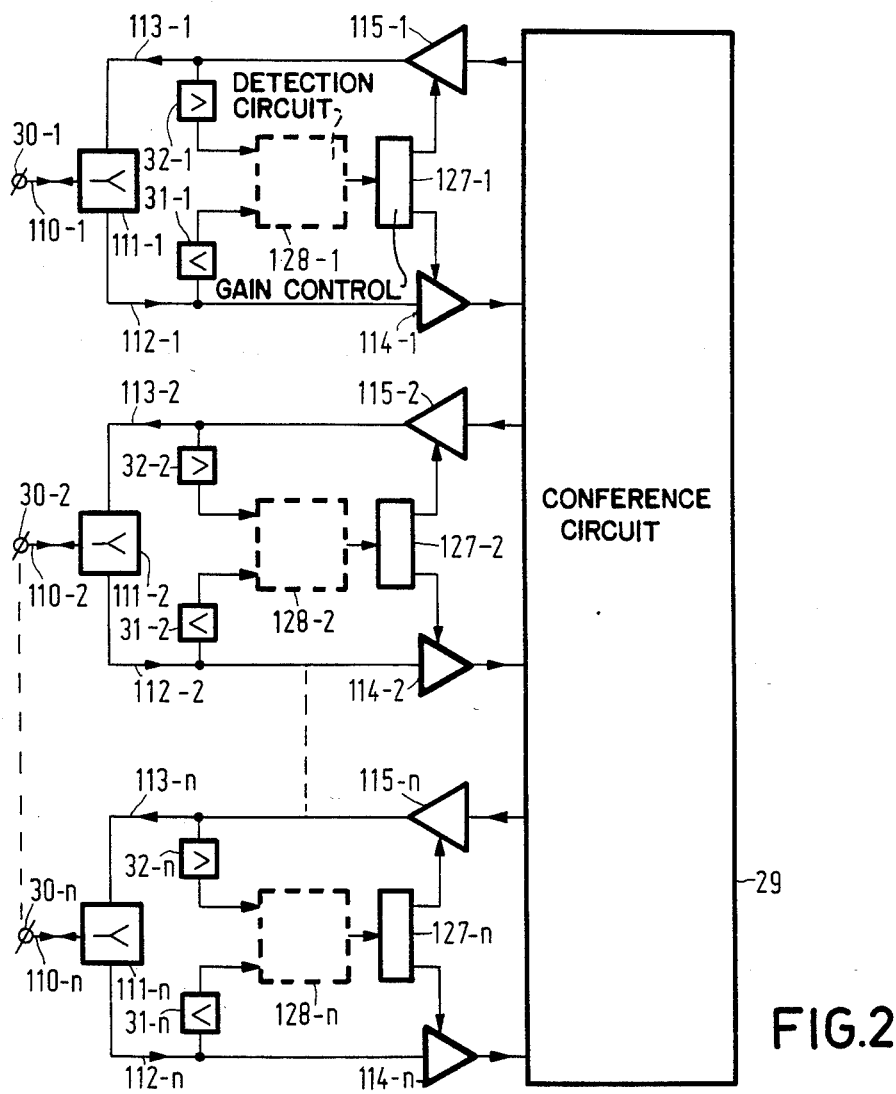

4,560,836

FOUR-WIRE COMMUNICATION LINE CIRCUIT AND CONFERENCE NETWORK COMPRISING SUCH CIRCUITS

BACKGROUND OF THE INVENTION

1. Field of the Invention

The invention relates to a four-wire communication line circuit comprising a first amplifier for one communication direction and a second amplifier for the other communication direction, control means for switching the relevant amplifier gain factors from a high value to a low value or the reverse, the four-wire line being coupled by a hybrid circuit to a two-wire subscriber line for two-way communication, and a transmission direction detection circuit for generating control signals for the control means depending on the direction in which net energy is transmitted.

2. Description of the Related Art

Such a four-wire connection line circuit is disclosed in Netherlands Pat. No. 136,420, in which it forms part of a telephone network for conference communication between a plurality of subscriber sets. A subscriber set has access to the other, similar, subscriber sets over a path comprising a two-wire line, a hybrid, the four-wire amplified line, a further hybrid and the other subscriber's two-wire line. By means of the transmission direction detection circuit, which is coupled to the two-wire line, it is determined in which direction the (net) speech energy flows. Thereafter, the amplifier in the four-wire line in that communication direction is rapidly switched to a high gain and the other amplifier which is included in the four-wire line for the other communication direction is simultaneously switched to a low gain. This circuit has the disadvantage that information from the two-wire line is required in order to switch the amplifiers in the four-wire line correctly. This requires additional signal wires. In addition, with electronic exchanges it is undesirable to take this information from the two-wire line as the signals are there still symmetrical relative to ground.

SUMMARY OF THE INVENTION

According to the invention, the transmission direction detection circuit for controlling the gain of the amplifier is the four-wire line is only coupled to the four-wire line.

The invention further relates to a circuit comprising a conference network to which three or more such four-wire lines are connected, each subscriber set being connected to a two-wire line which is coupled to one of the four-wire lines.

More specifically, when four-wire lines are used in a conference network, the problem is encountered that it is not certain that in all circumstances only the pair of amplifiers in the four-wire line of one conference participant (the speaker) will be controlled to operate in a direction opposite to that of the pairs of amplifiers in the four-wire lines of all other conference participants (the listeners). Due to interruptions, noise signals from mains, or ambient noise, it may happen that a net energy transfer towards the conference circuit will be detected in two or even more of the two-wire lines, and the associated pairs of amplifiers will all be switched over for transmission in the same direction.

It is an object of the invention to provide a solution for this problem. In a conference network according to the invention of the transmission direction detection circuit is coupled to means for attenuating the signal supplied thereto from one communication direction relative to the signal supplied thereto from the other communication direction on the four-wire line.

BRIEF DESCRIPTION OF THE DRAWINGS

The invention will now be further described by reference to the accompanying drawings in which:

FIG. 1 shows a four-wire communication line circuit comprising a transmission direction detection circuit in accordance with the invention, and FIG. 2 shows a telephone conference network in which four-wire communication line circuits in accordance with the invention are employed.

DESCRIPTION OF THE PREFERRED EMBODIMENTS

In FIG. 1 reference numeral 10 denotes a two-wire subscriber line for two-way communication. The two-wire line 10 is coupled via a hybrid circuit 11 to line pair 12 of a four-wire connection line for transmission in one direction and a four-wire line for transmission in the other direction. Gain controlled amplifiers 14 and 15, respectively are connected in the respective line pairs 12, 13 of the four-wire line to amplify the signals present on the relevant pair. A subscriber set is connected to the other side of the two-wire line; in FIG. 1 this is schematically shown by a terminating impedance 16 in series with a voltage source 17 to ground. The amplifiers 14 and 15 are controlled so that for a (net) information energy transfer to subscriber set 16, the amplifier 15 has a high gain factor and amplifier 14 a low gain factor, and for a (net) energy transfer from subscriber set 16, 17 to an other subscriber set the amplifier 14 has a high gain factor and amplifier 15 a low gain factor. In known telephone circuits (such as described, for example, in Netherlands Pat. No. 136,420) a transmission direction detection circuit is coupled to the two-wire line for the above purpose to determine the direction in which the net energy transport is effected. On the basis of that information the gain factor of amplifiers 14 and 15 in the four-wire line are controlled.

The invention provides an advantageous alternative. This solution is based on recognition of the following. Let hybrid 11 be an ideal hybrid comprising a balanced impedance 18 having a value R. It then holds that:

$$U_2 = \frac{RE}{Z+R} + \frac{(Z-R)U_1}{Z+R} ; \qquad (1)$$

$$U = \frac{RE}{Z+R} + \frac{2ZU_1}{Z+R} ; \qquad (2)$$

and $$IR = \frac{RE}{Z+R} - \frac{2RU_1}{Z+R} ; \qquad (3)$$

wherein $U_1$ is the voltage on receive direction line pair 13 of the four-wire line; $U_2$ the voltage on transmit direction line pair 12 of the four-wire line; I, U are the current and the voltage, respectively in two-wire subscriber line 10; Z is the value of terminating impedance 16 and E is the value of voltage source 17.

Equation (2) can be rewritten as $$U = \frac{RE}{Z+R} + \frac{(Z-R)U_1}{Z+R} + \frac{(Z+R)U_1}{Z+R} \quad (4a)$$

or
$$U = U_1 = U_2$$

Equation (3) can be rewritten as $$IR + \frac{RE}{Z+R} + \frac{(Z-R)U_1}{Z+R} - \frac{(Z+R)U_1}{Z+R} \quad (5a)$$

or
$$IR = U_2 - U_1 \quad (5b)$$

From equation (4b) it follows that a measure of the voltage U on the two-wire subscriber is given by the sum of the voltages ($U_1+U_2$) on the four-wire line, and from equation (5b) it follows that a measure of the current I in the two-wire subscriber line is given by the difference between the voltages $U_2-U_1$ on the four-wire line. This is utilized as follows. The voltage $U_1$ on four-wire line pair 13 is conveyed through a bandpass filter 19 and the voltage $U_2$ on four-wire line pair 12 is conveyed through a bandpass filter 20, the most important range, for example the speech range, being passed. Thereafter the two filtered voltages are applied to an adder element 21 and a difference element 22 to form a voltage which is a measure of U (cf. 4b) and I (cf. 5b), respectively. Thereafter the sum and difference voltages, respectively are applied to a limiter 23 and 24 which are corrected to a phase difference circuit 25. This circuit determines the phase difference between U and I and this phase difference is integrated over a certain period of time by an integrator 26 which is connected to phase difference circuit 25. Thereafter the sign of the integrated signal, which is the output signal produced by the complete detection circuit 28, is employed by gain control switch 27 to switch the gains of amplifiers 14 and 15; the amplifier 14 having a high gain and amplifier 15 a low gain in one case, and the amplifier 14 having a low gain and amplifier 15 having a high gain in the other case. The control switch 27 may be realized by means of an analog switch of the type HEF4052.

The circuit has the advantage that no signal wires from the four-wire line to the two-wire line are required.

This circuit may be used in various connection circuits comprising amplifiers and more specifically in telephone conference networks.

FIG. 2 shows a telephone conference network employing a conventional conference circuit network 29 to which n four-wire line pairs 112-1, 112-2, ... 112-n for transmission in one direction and 113-1, 113-2, ... 113-n for transmission in the opposite direction are connected. In order to indicate the relationship between elements shown in FIG. 2 which are the same as those shown in FIG. 1, the identifying reference numerals of such elements in FIG. 2 are those of the corresponding elements in FIG. 1 increased by 100. The four-wire lines comprise amplifiers 114-$i$ and 115-$i$ ($i=1, 2, \ldots n$) the gain factor of which are switched by control switches 127-$i$. Each of the four-wire line pairs 112-$i$ and, 113-$i$ is connected by a hybrid circuit 111-$i$ to a two-wire line 110-$i$, it being possible to connect subscriber sets to the other side of the two-wire lines by means of terminals 30-$i$. The transmission direction detection circuits 128-$i$ are coupled to the four-wire line pairs 112-$i$/113-$i$.

The conference network comprising the four-wire lines operates as follows. Let it be assumed that the subscriber set connected to terminal 30-1 is active (transmission) and the other subscriber sets 30-2, ... 30-$m$ are passive (receiving). Then detection circuit 128-1 will detect that the net energy in two-wire line 110-1 flows to conference network 29 and the detection circuits 128-2, ... 128-$n$ will detect that the net energy in the associated two-wire lines 110-2, ... 110-$n$ flows from conference switch circuit 29. Consequently, amplifier 114-1 and also the amplifiers 115-2, 115-3, ... 115-$n$ will be adjusted to a high gain and amplifier 115-1 and also the amplifiers 114-2, 114-3, ... 114-$n$ will be adjusted to a low gain.

It may happen that several subscriber sets are detected as being active simultaneously, which may be the result of subscriber set interruptions, noise signals from the telephony network or high ambient noise at a subscriber set. To prevent this, an attenuation circuit 31-$i$ ($i=1, 2, \ldots n$) is provided in one of the supply lines to each of the detection circuits for attenuating the signal coming from four-wire line 112-$i$ for the active direction of transmission. For the passive direction of transmission an amplifier circuit 32-1 is provided in the other of the supply lines to each of the detection circuits coupled to four-wire line 113-$i$. In the above-cited example, in which the subscriber set which is coupled to terminals 30-1 is active and consequently amplifier 114-1 has a high gain and amplifier 115-1 a low gain, the above-described measures accomplish that a threshold is built-in to prevent the amplifiers 114/115 in the other four-wire line from switching over in the event that the relevant subscriber set becomes active. These amplifiers will not be switched by their subscriber sets until this threshold is exceeded. In a conference network arranged for 8 participants and in which the conference switching circuit has an attenuation of $8\frac{1}{2}$ dB, the attenuation circuits 31-$i$ may have an attenuation of $-4\frac{1}{4}$ dB, while the amplifier circuit 32-$i$ may have a gain of $4\frac{1}{4}$ dB.

It should be noted that the designation of the amplifier circuits 32-$i$ and the attenuation circuits 31-$i$, respectively, is to indicate the relative signal processing operation effected; the two circuits might with equal effect both be amplifiers or both be attenuators. In practive it is advantageous for both circuits to be in the form of attenuators; 31-$i$ having a comparatively high attenuation and 32-$i$ having a comparatively low attenuation.

This conference network has the advantage that a threshold is provided against unwanted and frequent change-over actions. In addition, the amplification of signals simultaneously coming from different subscriber sets is counteracted, while the attenuation for subscriber sets which are not active is not affected.

What is claimed is:

1. A four-wire communication line circuit comprising a first amplifier for signal voltages transmitted in one direction and a second amplifier for signal voltages transmitted in the opposite direction on such communication line; control means for switching the gain factor of each of said amplifiers between a high value and a low value; a hybrid circuit for coupling the four-wire communication line to a two-wire subscriber line for two-way communication thereon; and a transmission direction detection circuit coupled to the four-wire communication line for generating a control signal for the control means dependent on the direction in which net energy is transmitted on the two-wire subscriber line, such detection circuit comprising: adding means coupled to the four-wire communication line for obtaining the sum of the signal voltages transmitted thereon, subtracting means coupled to the four-wire communication line for obtaining the difference of the signal voltages transmitted thereon, and phase difference detecting means coupled to the adding and subtracting means for deriving said control signal from the phase difference between said sum and difference voltages.

2. A four-wire communication line circuit as claimed in claim 1, wherein said phase difference detecting means comprises circuit means for producing a signal corresponding to the phase difference between said sum and difference voltages, and an integrating circuit coupled to said phase difference circuit means adapted to integrate the signal produced thereby over a predetermined time interval, such integrated signal constituting said control signal.

3. A four-wire communication line circuit as claimed in claim 1, further comprising circuit means coupling said four-wire communication line to said transmission direction detection circuit for applying thereto the signal voltages in each communication direction on said four-wire communication line, said coupling means being adapted to attenuate the signal voltage applied to said detection circuit from one such communication direction relative to the signal voltage applied to said detection circuit from the opposite communication direction, whereby different threshold levels are established at which signal voltages from opposite communication directions will cause said detection circuit to produce control signals corresponding to such communication directions.

4. A transmission direction detection circuit adapted to be coupled to a four-wire communication line circuit over which signal voltages are transmitted in one communication direction over a first pair of lines of such communication line and signal voltages are transmitted in the opposite communication direction over a second pair of lines of such communication line, said four-wire communication line circuit comprising first and second amplifiers respectively connected in said first and second line pairs, a hybrid circuit for coupling said line pairs to a two-wire subscriber line for two-way communication thereon, and gain control means adapted in response to a control signal applied thereto to oppositely switch the gain factors of each of said amplifiers between a high and a low value; said transmission direction detection circuit comprising:

adding means adapted to be coupled to said first and second line pairs for obtaining the sum of the signal voltages transmitted thereon;

subtracting means adapted to be coupled to said first and second line pairs for obtaining the difference of the signal voltages transmitted thereon;

phase difference detecting means coupled to said adding and subtracting means for deriving said control signal from the phase difference between said sum and difference voltages;

and means coupled to said phase difference detecting means for applying said control signal to said gain control means.

* * * * *